US009992938B2

(12) United States Patent
Farrer et al.

(10) Patent No.: US 9,992,938 B2
(45) Date of Patent: Jun. 12, 2018

(54) TARP TOOL

(71) Applicant: Lawns Etc. LLC, Lafayette, IN (US)

(72) Inventors: Benjamin Farrer, Lafayette, IN (US); Aaron Farrer, Lafayette, IN (US)

(73) Assignee: Lawns Etc. LLC, Lafayette, IN (US)

( * ) Notice: Subject to any disclaimer, the term of this patent is extended or adjusted under 35 U.S.C. 154(b) by 22 days.

(21) Appl. No.: 15/259,544

(22) Filed: Sep. 8, 2016

(65) Prior Publication Data

US 2018/0064035 A1 Mar. 8, 2018

(51) Int. Cl.
*B62B 15/00* (2006.01)
*A01G 1/12* (2006.01)

(52) U.S. Cl.
CPC ............ *A01G 20/30* (2018.02); *A01G 1/12* (2013.01); *B62B 15/00* (2013.01)

(58) Field of Classification Search
CPC .................................. A01G 1/12; B62B 15/00
USPC ....... 294/142, 150, 152, 154, 155, 156, 159, 294/165, 137
See application file for complete search history.

(56) References Cited

U.S. PATENT DOCUMENTS

| | | | | |
|---|---|---|---|---|
| 2,431,780 A * | 12/1947 | Theal | ......................... | A45F 3/14 224/157 |
| 4,039,217 A * | 8/1977 | Bryant | ..................... | B66C 1/122 294/74 |
| 4,124,244 A * | 11/1978 | Bryant | ....................... | B66C 1/12 294/74 |
| 4,441,748 A * | 4/1984 | St. Germain | ........... | B66C 1/122 294/74 |
| 5,279,432 A * | 1/1994 | Pryor | ........................ | B61G 7/00 213/111 |
| 5,503,448 A * | 4/1996 | Dewey | .................... | A45C 13/38 294/152 |
| 5,529,321 A | 6/1996 | Thompson | | |
| 5,833,292 A * | 11/1998 | Lyons, Jr. | ................. | A45F 3/14 294/152 |
| 5,943,831 A * | 8/1999 | Pangburn | .................. | B65F 1/00 16/DIG. 12 |
| 6,508,389 B1 * | 1/2003 | Ripoyla | ..................... | A45F 3/14 182/3 |
| 6,565,101 B2 | 5/2003 | Jones, Jr. et al. | | |

(Continued)

OTHER PUBLICATIONS

Leaf Hauler Timesaver Tarp Tool Yard Debris Collection Efficient Durable Easy, https://www.ebay.com/itm/Leaf-Hauler-Timesaver-Tarp-Tool-Yard-Debris-Collection-Efficient-Durable-Easy-/292096222903, captured Dec. 7, 2017.

(Continued)

*Primary Examiner* — Paul T Chin
(74) *Attorney, Agent, or Firm* — D'Hue Law LLC; Cedric A. D'Hue

(57) ABSTRACT

A manufactured device comprised of a high strength, padded strap with carabiner clips attached onto both ends intended to make a tarp easier to drag under load when attached. The device may be strapped about the body like a chest strap or belt, or drug by other equipment. The device includes a pad to be placed upon the body for comfort while using. The device is not meant to be pulled by hand backwards, nor does it consist of anything being tied or secured upon the body. It attaches via the carabiners to the eyelets which are universal and of a standard size on every tarp. Methods for moving debris using the device and a tarp are also disclosed.

14 Claims, 4 Drawing Sheets

(56) References Cited

U.S. PATENT DOCUMENTS

| | | |
|---|---|---|
| 8,091,937 B2 | 1/2012 | Mastromatto et al. |
| 8,720,462 B2 * | 5/2014 | Vieira .................. B25G 1/02 |
| | | 135/118 |
| 8,955,892 B1 | 2/2015 | Shumate |
| 9,232,699 B1 | 1/2016 | Tosto |
| 2005/0057056 A1 * | 3/2005 | Davis ................... A45F 3/14 |
| | | 294/152 |
| 2009/0014483 A1 * | 1/2009 | Green ............... A41D 13/0007 |
| | | 224/157 |
| 2010/0025445 A1 * | 2/2010 | Brunson ............... A45F 3/14 |
| | | 224/579 |

OTHER PUBLICATIONS

Seals Spray Skirts & Accessories, How to use a Seals Tow Rope Belt: 50', Aug. 26, 2012, available online at https://www.youtube.com/watch?v=75oZ2FmLur8.

* cited by examiner

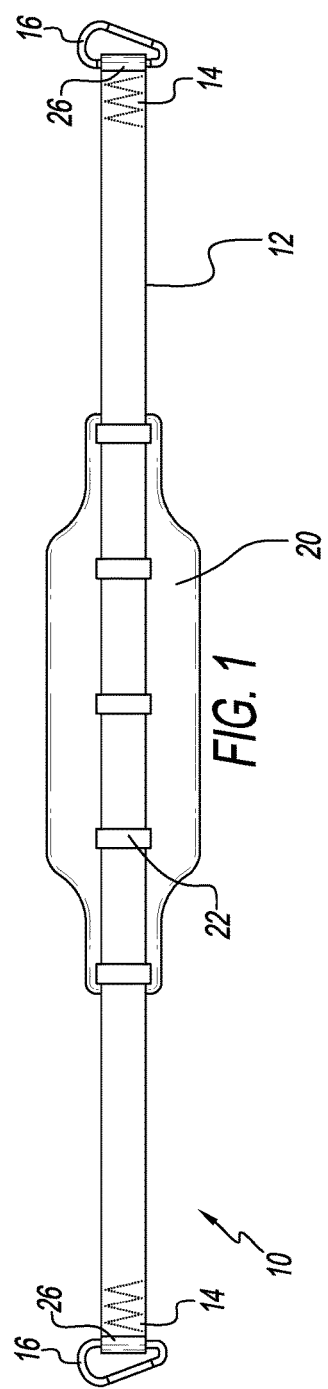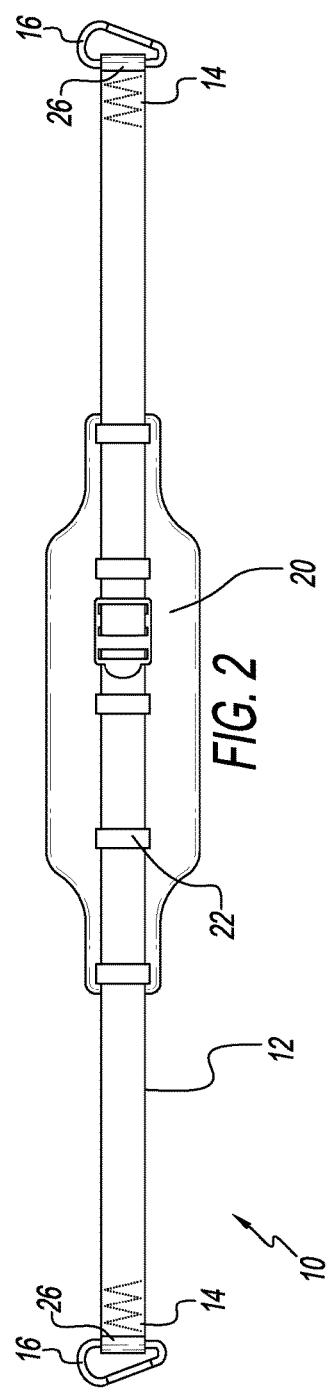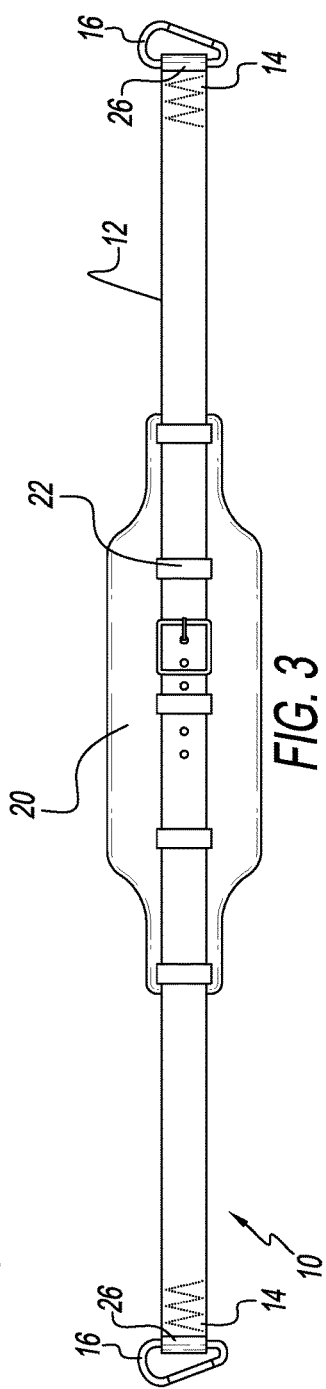

TARP TOOL

FIELD

The present invention relates to the field of lawn tarps, more specifically, towable lawn tarps.

BACKGROUND

Aspects and embodiments of the present disclosure are directed generally to apparatus and methods for towing tarpaulins, sheets, and related objects and methods for moving or hauling such objects.

Tarpaulins have long been used for collecting and hauling lawn refuse and litter. Problems emerge in using a simple tarpaulin for lawn refuse. Deployment of a tarpaulin requires an estimate of the amount and weight of lawn refuse and litter on the tarpaulin that the user can clasp and drag with hands. Typically a user's fingers must clasp and hold on to the tarpaulin from where the tarpaulin is being loaded to where the tarpaulin is being unloaded. Putting too much hauled material on the tarpaulin may lead to uncomfortable feelings in the fingers and hands of the user as the user struggles to move the tarpaulin and its too heavy contents to where the tarpaulin is being unloaded. Putting too little hauled material on the tarpaulin may lead to multiple or an excessive number of trips from where the tarpaulin is being loaded to where the tarpaulin is being unloaded.

Sometimes the tarpaulin with contents must be lifted or turned adding to the amount of force needed by the user's fingers. The edges of tarpaulins holding lawn refuse and litter that are not being manipulated by the user are often left to drag along the ground, providing opportunity for refuse and litter to escape the tarpaulin and require recollection of hauled material. Material on a tarpaulin may be transported by the wind providing another opportunity for refuse and litter to escape the tarpaulin and require recollection of hauled material.

A tarpaulin may be pinched at the corners and drug by the hands and fingers of the user while the user walks backwards and/or is hunched over or to the side of the tarpaulin. These conditions may lead to an uncomfortable, inefficient or even painful transport of the tarpaulin and its hauled contents.

U.S. Pat. No. 9,232,699, titled "Towable lawn tarp", is described as a belt 30 worn and retained around the user's waist 36 (FIGS. 4 and 5) with a rope 60 removably coupled to a clip 58 to the panel 12 and the rings 46 of belt 30. The user tows objects with the towable lawn tarp.

U.S. Pat. No. 8,720,462, titled "Apparatus configured to manipulate a tarpaulin", describes an apparatus with a strap connected to a handle on one end, and a carabiner clip on the other end. The apparatus is used by pulling on the handle and dragging. A user's fingers must clasp and hold on to the handle from where the tarpaulin is being loaded to where the tarpaulin is being unloaded. Sometimes the tarpaulin must be lifted or turned adding to the amount of force needed by the user's fingers since the only tarpaulin manipulation point on the apparatus is the handle. The '462 uses a carabiner to couple the strap to the tarp, but it uses a stake to anchor the tarp.

U.S. Pat. No. 8,955,892, titled "Hauling device", describes a mat for gathering and hauling materials. The device is dragged or carried, additional fasteners are used to hold down the mat. Additional handles may be attached to the front edge to allow a person to drag or carry the mat.

U.S. Pat. No. 6,565,101, titled "Hauling tarpaulin for single-handed operation", discloses a tarp rolled about a mandrel. A mandrel is a cylindrical rod around which another material is shaped. The tarp is unrolled from the mandrel for use. The mandrel holds the tarp flat on the ground.

SUMMARY

A device intended to make a tarp easier to drag under load when attached, the device comprising a high strength strap about ten feet in length with carabiner clips on both ends of the strap, the ends of the strap sewn closed around each carabiner clip, each carabiner clip configured to bind to the metal eyelets standard on most tarps, and a pad removably attached to the strap, the strap configured to be located about the waist, chest or shoulder of the user, wherein the device allows a user to drag the tarp without use of the user's hands.

In an embodiment of the present disclosure, there is provided a device comprising a high strength strap about ten feet in length, with each end of the strap sewn around a carabiner clip, each carabiner clip is configured to bind to the metal eyelets standard on most tarps. A pad is fixed to the middle of the strap.

In another embodiment of the present disclosure, there is provided a device comprising a high strength adjustable strap, where the adjustable strap may be from a strap adjuster or a buckle configuration.

In yet another embodiment of the present disclosure, the strap is configured to be located about the seat of a lawnmower, tractor, other powered device, or harnessed animal.

In yet another embodiment of the present disclosure, additional carabiner clips are attached to the metal eyelets on the side of the tarp furthest from the user. The additional carabiner clips are configured to weigh down the tarp or provide easy attachment of a second or subsequent device.

In yet another embodiment of the present disclosure, two devices are used in combination to lift the tarp off the ground by two users on opposite sides of the tarp.

In another embodiment of the present disclosure, the device is not meant to be pulled by hand backwards.

In accordance with an aspect of the present disclosure, there is provided a device comprising a high strength strap about ten feet in length, with each end of the strap sewn around a carabiner clip, each carabiner clip is configured to bind to the metal eyelets standard on most tarps. A pad is fixed to the middle of the strap. The device allows the user to drag a tarp without the use of the user's hands.

In one aspect, additional carabiner clips are attached to the metal eyelets on the side of the tarp furthest from the user. The additional carabiner clips are configured to weigh down the tarp or provide easy attachment of a second device.

In one aspect, two devices in combination are used to lift the tarp off the ground by two users.

In one aspect, the strap is configured to be located about the seat of a lawnmower, tractor, other powered device, or harnessed animal.

In one aspect, the device is not meant to be pulled by hand backwards.

An object of the invention is a strap with carabiner clips on both ends intended to make a tarp easier to drag under load when attached.

BRIEF DESCRIPTION OF THE DRAWINGS

The above-mentioned and other features of this disclosure, and the manner of attaining them, will become more apparent and the disclosure itself will be better understood by reference to the following description of embodiments of the disclosure taken in conjunction with the accompanying drawings, wherein:

FIG. 1 displays a tarp tool according to an embodiment of the present disclosure.

FIG. 2 displays a tarp tool according to another embodiment of the present disclosure where the strap is adjustable in length by including a strap adjuster.

FIG. 3 displays a tarp tool according to yet another embodiment of the present disclosure where the strap is adjustable in length by including a strap buckle and the strap defines apertures for the strap buckle.

Figure 4:
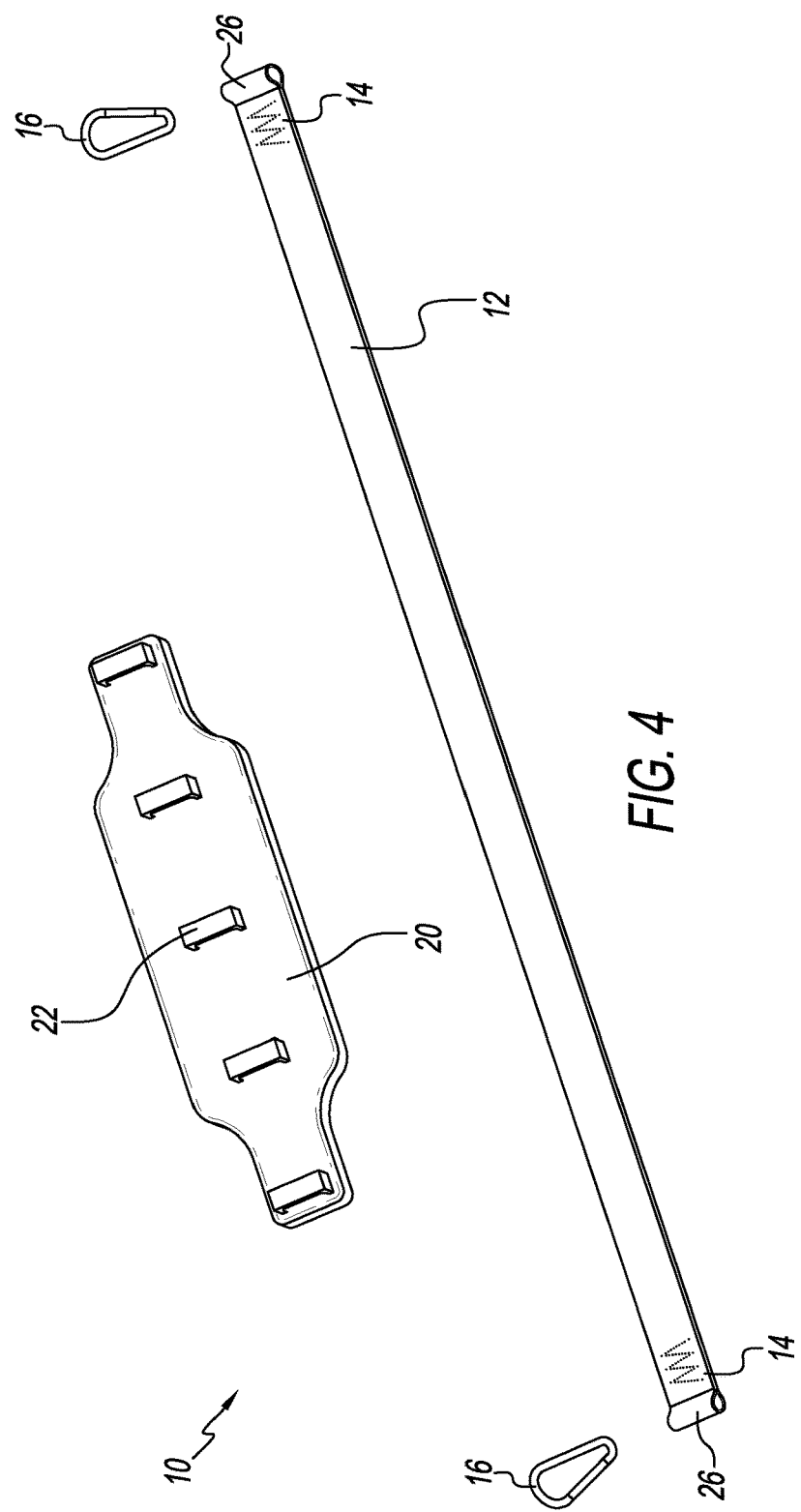
FIG. 4 is an exploded view of tarp tool of FIG. 1.

Corresponding reference characters indicate corresponding parts throughout the several views. Although the drawings represent embodiments of the present disclosure, the drawings are not necessarily to scale and certain features may be exaggerated in order to better illustrate and explain the present disclosure.

DETAILED DESCRIPTION OF THE EXEMPLARY EMBODIMENTS

The embodiments disclosed below are not intended to be exhaustive or limit the disclosure to the precise forms disclosed in the following detailed description. Rather, the embodiments are chosen and described so that others skilled in the art may utilize their teachings.

Figure 5:
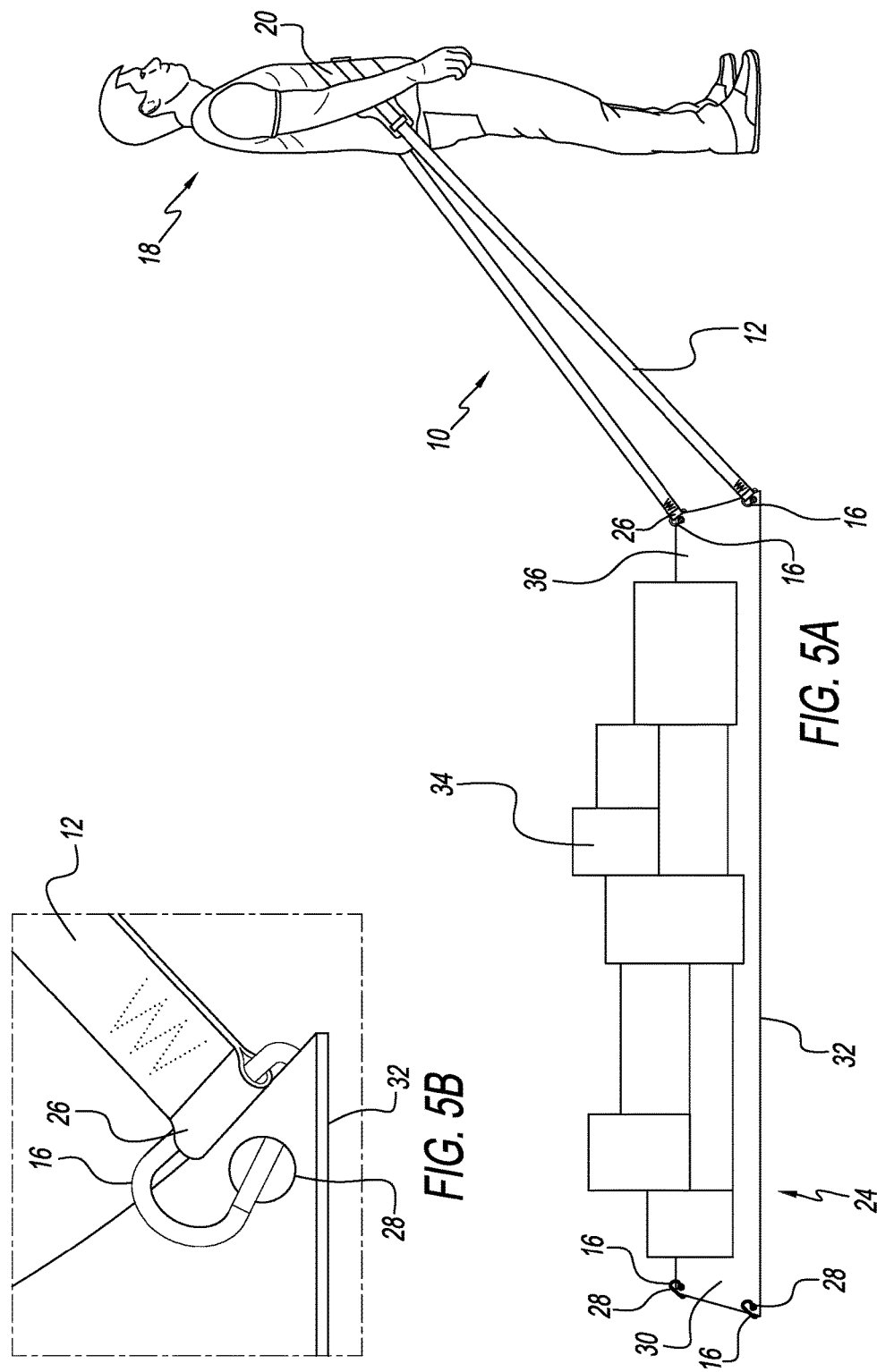
FIG. 5A displays a method of use for the tarp tool.
FIG. 5B displays a magnified view of the FIG. 5A.

Referring to FIG. 1, tarp tool 10 includes strap 12, with ends 14 sewn around carabiner clips 16. The pad is attached to the high strength strap and placed on user 18 (FIG. 5A). As best illustrated in FIGS. 1-4, pad 20 is removably coupled to strap 12 by loops 22. Loops 22 may be fastened to pad 20 by any means such as sewn or hook and loop fasteners.

Strap 12 is made from cotton, polyester, polypropylene or nylon. High strength means the strap has a tensile strength exceeding about 1,000 lbs/in, preferably exceeding about 1,500 lbs/in, and even more preferably within the range of about 1,500 lbs/in to about 4,300 lbs/in. Strap 12 widths typically range, but are not limited to, from about 1 to about 2 inches. Strap 12 thickness typically range, but are not limited to, from about 0.035 inches to about 0.074 inches, typical thickness is about 0.044 inches or about 0.053 inches.

Strap 12 is within the range of about six to about twenty feet in length, preferably between about eight and about twelve feet in length and even more preferably about ten feet in length. Length of strap 12 is correlated with the width of at least one side of a tarpaulin. The relationship between the length of the strap 12 and the width of any side of tarpaulin 24 is that the length of the strap 12 benefits from being longer than the width of the side of the tarpaulin. A strap 12 shorter than the width of the side of the tarpaulin benefits in bringing corners of the tarpaulin together when using the tarp tool 10. However, the size, shape and rigidity of the hauled material on the tarpaulin must be taken into consideration as well as the likelihood of the strap rubbing against the hauled material. The length of the strap should also not be so long as to have portions of the strap drag on the ground as straps can breakdown from interactions with dirt, damp or wet conditions.

Tarp tool 10 is easy to use. There are no belts to attach to user. There are no ropes or strings to pass through loops on a belt. Tarp tool 10 can be as easily worn about the waist, chest, back, or shoulders of user 18. Tarp tool 10 frees the user from grasping and pulling with user's fingers. User uses larger muscles in the legs and torso of the user to manipulate tarpaulin and its contents. Use of larger muscles makes it easier to take larger or heavier loads on tarp. Tarp tool 10 allows user's hands and fingers to make smaller manipulations of tarp 24 and its contents, such as lifting only corners of tarp 24. User's hands and fingers are also free to carry additional contents, such as additional hauling material or other tools, breakable contents, and the like.

Because strap 12 of tarp tool 10 does not include any particular fastening apparatus, tarp tool 10 could be mounted to a tractor or other towing device if additional force is needed to move the tarp 24 and its contents.

As best illustrated in FIGS. 1-4, carabiner clips are fastened to strap 12 by portions of the ends 14 of strap 12 sewn to define loops 26. Each carabiner clip 16 is communicated through an opening defined by each loop 26. Carabiner clips 16 may be removably attached to tarp 24 via eyelets 28 (FIG. 5B). Additional carabiner clips 16 may be attached to the side of tarp 24 opposite of user 18 to weight tarp 24 down or to aid in convenient attachment of additional tarp tool(s) 10 to tarp 24.

Tarpaulin 24 generally comprises panel 30 that is positionable on the ground so bottom surface 32 (FIGS. 5A and 6) of panel 30 may be supported by ground 38. Material 34 is positioned on top surface 36 of panel 30 after panel 30 is positioned on ground 38. Material 34 may include debris, lawn refuse, litter, boxes, trash, and a myriad of other similar things.

Figure 6:
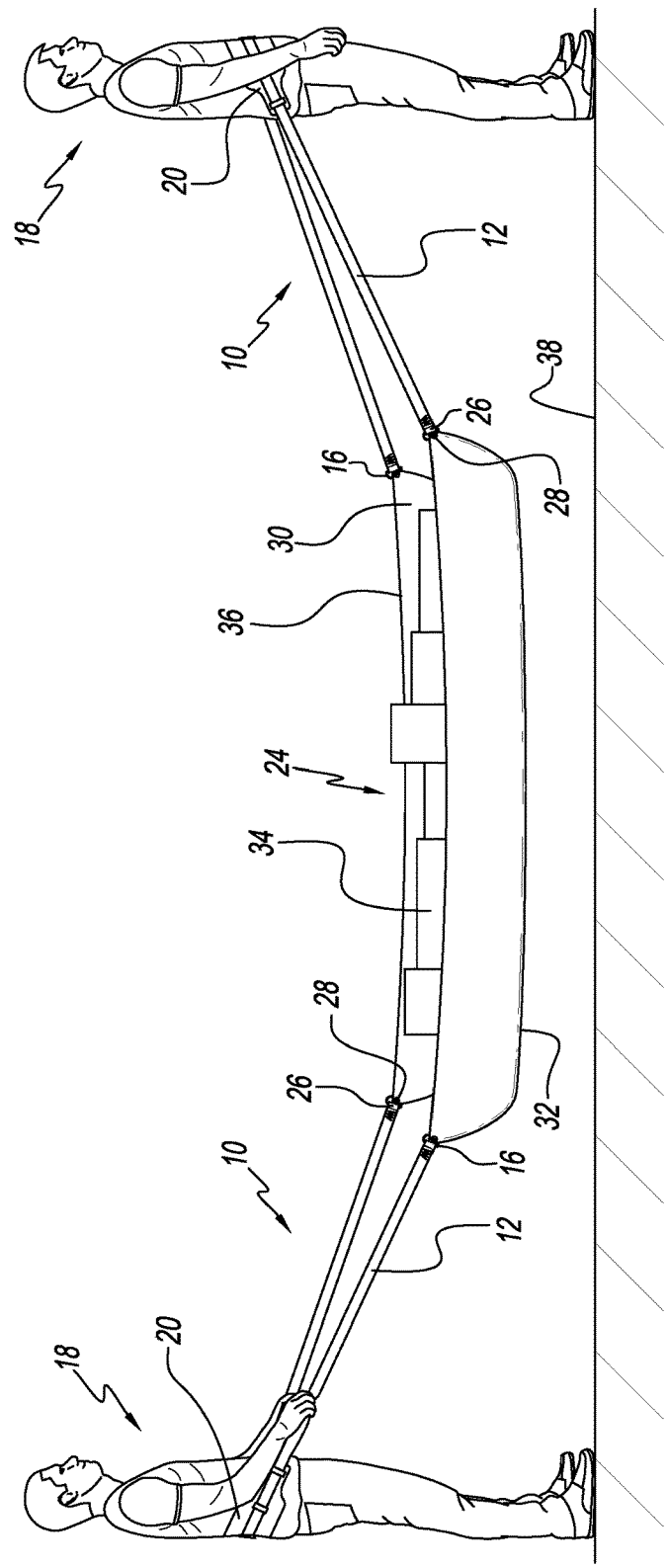
FIG. 6 displays another method of using two or multiple tarp tools.

As illustrated in FIG. 6, two users 18 and two tarp tools 10 are displayed for use with one tarp 24. A second user 18 and a second tarp tool 10 are attached to a side of tarp 24 opposite of first user 18. Debris or other materials are on top of the tarp. The two users 18 can move in opposite directions and lift the tarp off of the ground 38. With the tarp off of the ground 38, the users 18 can move in a same direction while retaining enough force between them to keep the tarp off of the ground 38.

While not shown, it is envisioned that more than two users 18 can attach to different side of tarp 24 or the same side of tarp 24 to effectuate movement of tarp 24 and its Material 34. Several viable options are envisioned: (1) two or more users along the same side of tarp 24 in order to increase the amount of force to drag tarp 24, (2) two or more users attached to tarp 24 along adjacent sides of tarp 24 in order to increase the amount of force to drag tarp 24, (3) two or more users where each tarp tool 10 is attached to only one eyelet of tarp 24, and combinations thereof. For example, four users where each user's tarp tool 10 is attached to its own eyelet of tarp 24 provides increased ability to lift tarp 24 off of ground 38 and make the most of the tensile strength of each strap 12.

While this disclosure has been described as having an exemplary design, the present disclosure may be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains.

What is claimed is:

1. A method of moving yard debris on a tarp comprised of the steps:
   (a) providing a device intended to make a tarp easier to drag under load when attached, the device consisting of:
   a high strength strap about ten feet in length with carabiner clips on both ends of the strap, the ends of the strap sewn closed around each carabiner clip, each carabiner clip configured to bind to the metal eyelets standard on most tarps, and a single pad removably attached to the strap, the strap configured to be located individually about the waist, chest or-shoulder of the user, wherein the device allows a user to drag the tarp without use of the user's hands, (b) wherein the device is worn by a first user and attached to a side of the tarp, (c) wherein a second device is worn by a second user and attached to an opposite side of the tarp, (d) wherein the users move in opposite directions and lift the tarp off of the ground, and (e) wherein the users move in a same direction while retaining enough force between them to keep the tarp off of the ground.

2. The method of claim 1, wherein the strap is made from cotton, polyester, polypropylene or nylon.

3. The method of claim 1, wherein the strap has a tensile strength exceeding about 1,000 lbs/in.

4. The method of claim 1, wherein the tensile strength exceeds about 1,500 lbs/in.

5. The method of claim 1, wherein the tensile strength is within the range of about 1,500 lbs/in to about 4,300 lbs/in.

6. The method of claim 1, wherein the strap width is about 1 to about 2 inches.

7. The method of claim 1, wherein the strap thickness is within the range of about 0.035 inches to about 0.074 inches.

8. A method of moving material on a tarp comprising-of the steps:

(a) providing a device intended to make a tarp easier to drag under load when attached, the device consisting of:

a high strength strap about ten feet in length with carabiner clips on both ends of the strap, the ends of the strap sewn closed around each carabiner clip, each carabiner clip configured to bind to the metal eyelets standard on most tarps, and a single pad removably attached to the strap, the strap configured to be located individually about the waist, chest or-shoulder of the user, wherein the device allows a user to drag the tarp without use of the user's hands, (b) wherein the first provided device is worn by a first user and attached to a first side of the tarp, (c) wherein the second provided device is worn by a second user and attached to the tarp, and (d) wherein the users move in the same direction to increase the amount of force to effectuate movement of tarp and its material.

9. The method of claim 8 wherein the second device is attached to the same side of the tarp.

10. The method of claim 8 wherein the second device is attached to a side of the tarp adjacent to the first side of the tarp.

11. The method of claim 8:

wherein the first device is attached to one eyelet of the tarp.

12. The method of claim 8, wherein the strap thickness is about 0.044 inches or about 0.053 inches.

13. The method of claim 8, wherein the strap has an adjustable length.

14. The method of claim 8, wherein the adjustable strap includes a buckle or a strap adjuster.

* * * * *